United States Patent [19]

Minkoff

[11] 4,098,518
[45] Jul. 4, 1978

[54] TRANSPORT MEANS

[76] Inventor: William Minkoff, 15703 Redington Dr., Redington Beach, Fla. 33708

[21] Appl. No.: 766,253

[22] Filed: Feb. 7, 1977

[51] Int. Cl.² .............................................. B62B 1/14
[52] U.S. Cl. ............................................. 280/47.13 R
[58] Field of Search .................... 280/47.13 R, 79.1 A, 280/79.1 R

[56] References Cited

U.S. PATENT DOCUMENTS

| | | | |
|---|---|---|---|
| 605,162 | 6/1898 | Deane | 280/47.13 R |
| 1,339,861 | 5/1920 | Paddon | 280/47.13 R |
| 2,816,771 | 12/1957 | Hunt | 280/47.13 R |
| 3,845,969 | 11/1974 | Nadeau | 280/47.13 R |

FOREIGN PATENT DOCUMENTS 1,322,080   4/1973   United Kingdom ........... 280/79.1 A

*Primary Examiner*—John A. Pekar
*Attorney, Agent, or Firm*—Arthur W. Fisher, III

[57] ABSTRACT

A transport device comprising a pair of substantially identical dolly devices for moving hospital beds and the like. Each dolly device comprises an elongated base plate having a pair of swivel mounted casters or wheels attached to the lower surface thereof and an attachment member disposed on the upper surface thereof configured to operatively engage and secure the hospital bed thereto.

8 Claims, 4 Drawing Figures

TRANSPORT MEANS

BACKGROUND OF THE INVENTION

1. Field of the Invention

A transport means comprising a pair of substantially identical dolly devices for moving hospital beds and the like.

2. Description of the Prior Art

Numerous efforts have been made to provide means to facilitate the moving of articles with roller-carriages or dollys where the weight does not allow it to be otherwise easily moved.

Some such roller-carriages include adjustable cam-clamp to secure the articles thereto during moving.

Other devices include elaborate support platforms and handles or the like. Typical of such structures are U.S. Pat. Nos. 150,264; 605,162; 2,816,771; 3,508,601; 3,837,666; and 3,942,813.

Thus the need remains to provide a device of the kind to be described which is simple and efficient in operation and low in cost of operation and maintenance, thus reducing the cost of equipment while improving the service.

SUMMARY OF THE INVENTION

The present invention relates to a transport means comprising a pair of substantially identical dolly devices for moving hospital beds or the like. More specifically, each dolly device comprises an elongated base plate having a pair of swivel mounted casters or wheels attached to the lower surface thereof and an attachment member disposed on the upper surface thereof configured to operatively engage and secure the hospital bed thereto.

Each swivel mounted caster comprises a bracket rotatably attached to the elongated base plate and a caster or wheel rotatably attached to the bracket. The fastening means comprises an elongated elements such as a threaded bolt and a coupling element such as a nut attached to the upper end thereof.

Each attachment means comprises a first and second retainer element extending upwardly from a vertical separator element. The vertical separator element provides vertical separation from the upper surface to accommodate the bed as more fully described hereinafter. The positions of the first and second retainer elements relative to each other cooperatively form a first and second retainer openings respectively. The first or outer retainer opening is substantially greater than the second or inner retainer opening.

The attachment means may further include a second fastening means comprising a coupling means or bolt and nut combination to attach the bed to the dolly device as more fully described hereinafter. Alternately, the second fastening means may comprise a substantially horizontal retainer lip extending inwardly along the upper edge of the second retainer element to engage the bed as more fully described hereinafter.

The bed is set on its side on top of a pair of dolly devices. The rails extend through the inner retainer openings while the outer enlarged ends of the head and foot frames extend outwardly through the outer retainer openings such that the edges thereof are disposed between the first and second retainer elements. To affix the bed to the dolly devices, the bolt may be passed through an aperture in the bed and secured thereto by the nut. Alternately the second fastening means will secure the bed to the dolly devices since the retainer lip overlaps the frame portions in the vertical plane. The vertical separation provided by the vertical separator element accommodates head and foot board connectors. Balance is maintained since the attachment means is disposed at the center of gravity of the dolly device and that the longitudinal axis of each dolly device is substantially perpendicular to the longitudinal axis of the bed itself.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
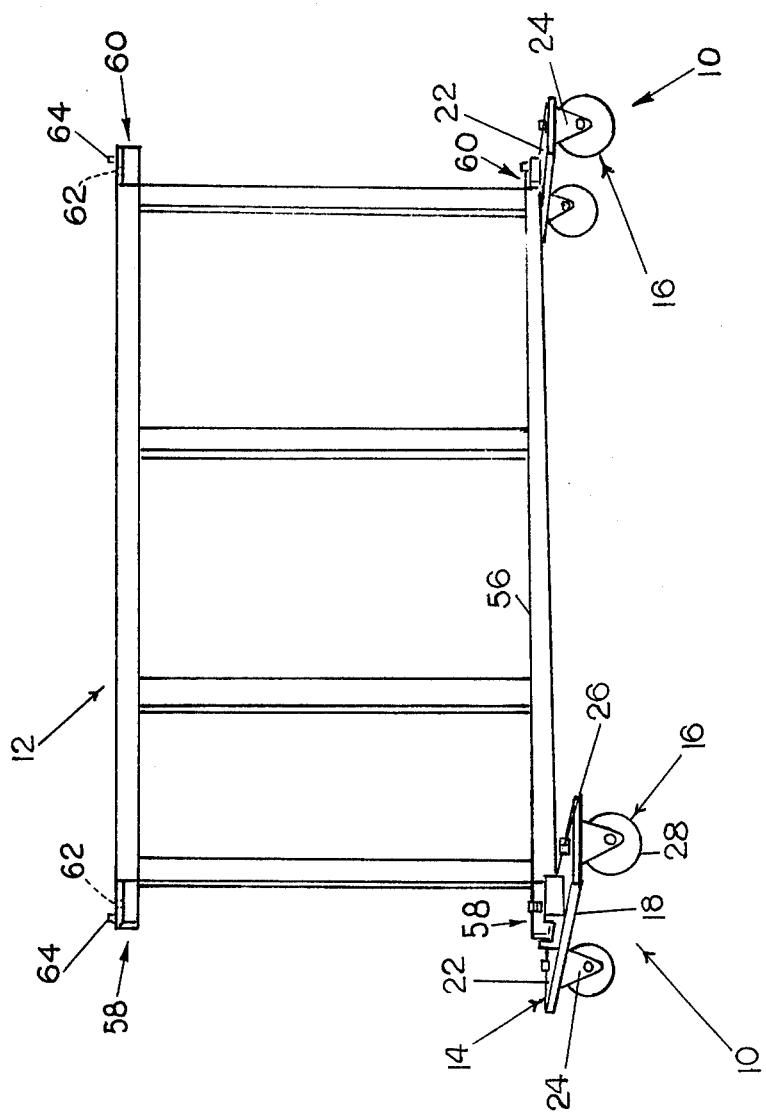
FIG. 1 is a perspective view of the transport means in supporting relationship with a bed.
Figure 2:
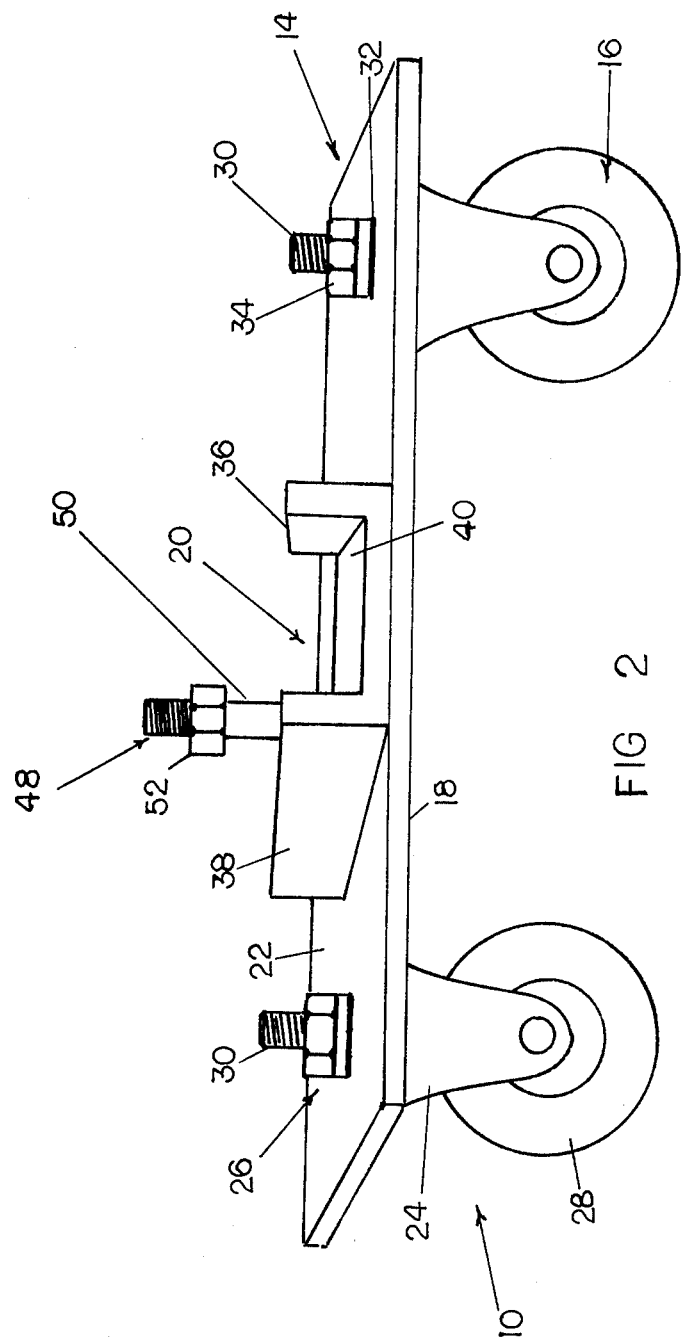
FIG. 2 is a detailed perspective view of a dolly device.
Figure 3:
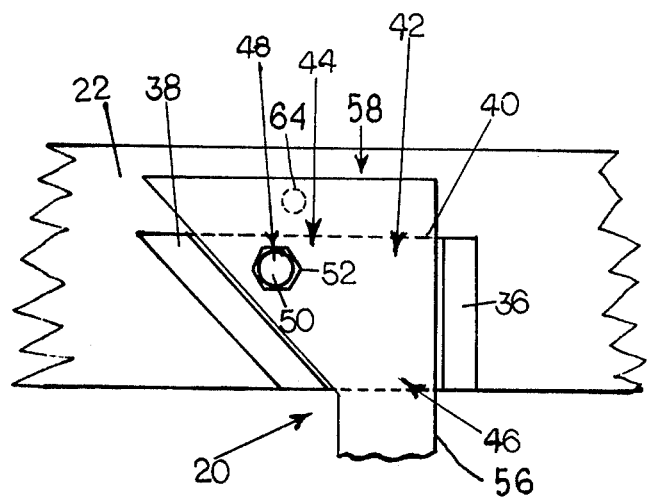
FIG. 3 is a detailed top partial view of a dolly device.

As shown in FIGS. 1 through 3, the transport means of the present invention comprises a pair of substantially identical dolly devices each generally indicated as 10 specifically configured for moving hospital beds or the like generally indicated as 12.

Each dolly device 10 comprises an elongated base plate generally indicated as 14 having a pair of swivel mounted casters or wheels each generally indicated as 16 attached to the lower surface 18 thereof and an attachment means generally indicated as 20 disposed on the upper surface 22 thereof.

Each swivel mounted caster 16 comprises a bracket 24 rotatably attached to the elongated base plate 14 by a first fastening means generally indicated as 26 and a caster or wheel 28 rotatably attached to the bracket 24. The fastening means 26 comprises an elongated element such as a threaded bolt 30 attached to the bracket 24 extending through aperture 32 formed in the elongated base plate 14 and a coupling element such as a nut 34 attached to the upper end thereof.

As best shown in FIG. 3, each attachment means 20 comprises a first and second retainer element 36 and 38 respectively extending upwardly from vertical separator element 40. The vertical separator element 40, formed on the upper surface 22, provides vertical separation from the upper surface 22 to accommodate the bed 12 as more fully described hereinafter. The first retainer element 36 is disposed substantially perpendicular to the longitudinally axis of the elongated base plate 14, while the second retainer element 38 is disposed relative to the first retainer element to cooperatively form a retainer channel 42 therebetween. The positions of the first and second retainer elements 36 and 38 relative to each other cooperatively form a first and second retainer openings 44 and 46 respectively. As is shown, the first or outer retainer opening 44 is substantially greater than the second or inner retainer opening 46. The first or outer retainer opening 44 is disposed inwardly of the edge of the elongated base plate 14.

Figure 4:
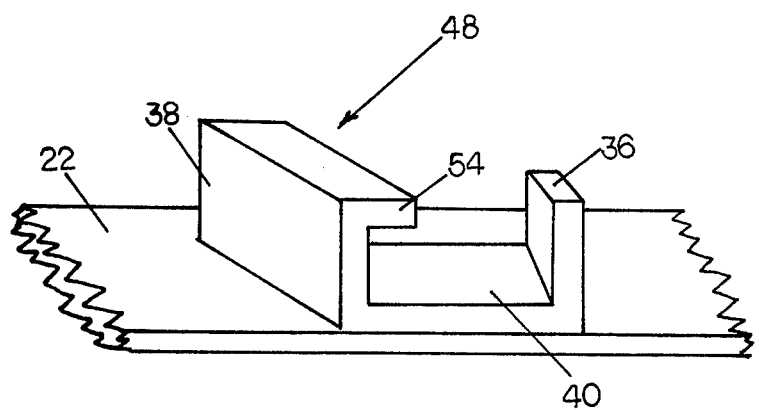
FIG. 4 is a perspective detailed partial view of the alternative embodiment of the attachment means.

As shown in FIGS. 2 and 3, the attachment means 20 may further include a second fastening means generally indicated as 48. The second fastening means 48 comprises a coupling means or bolt and nut 50 and 52 respectively to attach the bed 12 to the dolly device 10 as more fully described hereinafter. The second fastening means 48 may be affixed to the elongated base plate 14 or detachably extend through an aperture formed in the elongated base plate 14 and the vertical separator element 40. As shown in FIG. 4, alternately the second fastening means 48 may comprise a substantially horizontal retainer lip 54 extending inwardly along the upper edge of the second retainer element 38 to engage the bed 12 as more fully described hereinafter. To maintain balance of the bed 12 while on the transport means, the attachment means 20 is disposed at the center of gravity of the dolly device 10.

As shown in FIG. 1, the bed 12 is set on its side on top of a pair of dolly devices 10. The rail 56 extends through the inner retainer openings 46 while the outer enlarged ends of the head and foot frames 58 and 60 respectively extend outwardly through the outer retainer openings 44 such that the edges thereof are disposed between the first and second retainer elements 36 and 38. To affix the bed 12 to the dolly devices 10, the bolt 50 may be passed through an aperture 62 in the bed 12 and secured thereto by the nut 52. Alternately the second fastening means 48 will secure the bed 12 to the dolly devices 10 since the retainer lip 54 overlaps the frame portions in the vertical plane. The vertical separation provided by the vertical separator element 40 accommodates head and foot board connectors 64. Balance is maintained since the attachment means 20 is disposed at the center of gravity of the dolly device 10 and that the longitudinally axis of each dolly device 10 is substantially perpendicular to the longitudinal axis of the bed 12 itself.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A transport means comprising at least one dolly device for moving a bed or the like, said dolly device comprising an elongated base plate, a pair of swivel mounted casters attached to opposite ends of said elongated base plate and an attachment means disposed on the upper surface thereof to engage the bed, said attachment means comprises a first and second retainer element extending upwardly from said upper surface of said elongated base plate, said first and second retainer elements being disposed relative to each other to cooperatively form a channel therebetween to receive the bed, said first retainer element extending across said elongated base plate substantially perpendicular to the elongated extent of said elongated base plate and said second retainer element extending diagonally across said elongated base plate relative to said first retainer element to cooperatively form a first and second retainer opening therebetween at opposite ends of said channel, said first and second retainer openings being disposed in horizontally spaced relation to each other, said first retainer opening being greater than said second retainer opening.

2. The transport means of claim 1 wherein said attachment means further includes a vertical separator element formed on said upper surface of said elongated base plate to provide vertical separation therebetween to accommodate the bed.

3. The transport means of claim 1 wherein each said caster includes a fastening means to couple each said caster to said elongated base plate.

4. The transport means of claim 1 wherein said attachment means further includes a fastening means to couple the bed to said dolly device.

5. The transport means of claim 4 wherein said fastening means comprises a lip formed on said second retainer element to retain a portion of the bed between said lip and said elongated base plate.

6. The transport means of claim 4 wherein said fastening means comprises a bolt extending upwardly from said elongated base plate in combination with a nut coupled to the upper portion of said bolt to attach the bed thereon.

7. The transport means of claim 6 wherein said fastening means is disposed at the center of gravity of said dolly device.

8. The transport means of claim 1 further comprising a second dolly device, said dolly devices being disposed at opposite ends of the bed.

* * * * *